US009464181B2

(12) United States Patent
Tong et al.

(10) Patent No.: US 9,464,181 B2
(45) Date of Patent: Oct. 11, 2016

(54) HIGH FILLER LOADED POLYMER COMPOSITION

(75) Inventors: Jun Tong, Shanghai (CN); Xiao Bo Peng, Shanghai (CN); Liang Li, Shanghai (CN); Qi Ying, Shanghai (CN)

(73) Assignee: ExxonMobil Chemical Patents Inc., Baytown, TX (US)

( * ) Notice: Subject to any disclaimer, the term of this patent is extended or adjusted under 35 U.S.C. 154(b) by 517 days.

(21) Appl. No.: 13/879,446

(22) PCT Filed: Nov. 24, 2010

(86) PCT No.: PCT/CN2010/001885
§ 371 (c)(1),
(2), (4) Date: Jul. 23, 2013

(87) PCT Pub. No.: WO2012/068703
PCT Pub. Date: May 31, 2012

(65) Prior Publication Data
US 2015/0038637 A1   Feb. 5, 2015

(51) Int. Cl.
| | | |
|---|---|---|
| *C08K 3/34* | (2006.01) | |
| *C08K 3/26* | (2006.01) | |
| *C08K 3/18* | (2006.01) | |
| *C08K 3/22* | (2006.01) | |
| *C08L 23/14* | (2006.01) | |
| *C08J 3/20* | (2006.01) | |
| *C08L 23/08* | (2006.01) | |
| *C08L 23/12* | (2006.01) | |
| *C08L 23/16* | (2006.01) | |
| *C08J 3/22* | (2006.01) | |
| *C08K 3/00* | (2006.01) | |
| *C08K 3/04* | (2006.01) | |
| *C08K 5/14* | (2006.01) | |
| *C08K 3/16* | (2006.01) | |

(52) U.S. Cl.
CPC .................. *C08K 3/34* (2013.01); *C08J 3/203* (2013.01); *C08J 3/226* (2013.01); *C08K 3/0033* (2013.01); *C08K 3/04* (2013.01); *C08K 3/18* (2013.01); *C08K 3/22* (2013.01); *C08K 3/26* (2013.01); *C08K 5/14* (2013.01); *C08L 23/0815* (2013.01); *C08L 23/12* (2013.01); *C08L 23/14* (2013.01); *C08L 23/16* (2013.01); *C08J 2323/10* (2013.01); *C08J 2323/14* (2013.01); *C08J 2423/08* (2013.01); *C08J 2423/14* (2013.01); *C08K 2003/162* (2013.01); *C08K 2003/2224* (2013.01); *C08K 2003/2227* (2013.01); *C08K 2003/2265* (2013.01); *C08K 2003/2296* (2013.01); *C08K 2003/265* (2013.01); *C08L 23/142* (2013.01); *C08L 2203/16* (2013.01); *C08L 2203/202* (2013.01); *C08L 2205/025* (2013.01)

(58) Field of Classification Search
CPC ............ C08K 3/34; C08K 3/26; C08K 3/18; C08K 3/22; C08K 2003/265; C08K 2003/2227; C08K 2003/2296; C08L 23/14; C08L 2203/202; C08L 2203/16; C08L 2205/025; C08J 3/203; C08J 2323/14
USPC ......................................... 524/425, 528, 570
See application file for complete search history.

(56) References Cited

U.S. PATENT DOCUMENTS

| | | |
|---|---|---|
| 4,241,123 A | 12/1980 | Shih |
| 4,543,399 A | 9/1985 | Jenkins, III et al. |
| 4,588,790 A | 5/1986 | Jenkins, III et al. |
| 5,001,205 A | 3/1991 | Hoel |
| 5,028,670 A | 7/1991 | Chinh et al. |
| 5,044,438 A | 9/1991 | Young |
| 5,057,475 A | 10/1991 | Canich et al. |
| 5,064,802 A | 11/1991 | Stevens et al. |
| 5,096,867 A | 3/1992 | Canich |
| 5,132,380 A | 7/1992 | Stevens et al. |
| 5,290,886 A | 3/1994 | Ellul |
| 5,317,036 A | 5/1994 | Brady, III et al. |
| 5,324,800 A | 6/1994 | Welborn, Jr. et al. |
| 5,352,749 A | 10/1994 | DeChellis et al. |
| 5,397,832 A | 3/1995 | Ellul |
| 5,405,922 A | 4/1995 | DeChellis et al. |

(Continued)

FOREIGN PATENT DOCUMENTS

| | | |
|---|---|---|
| EP | 0 468 651 | 1/1992 |
| EP | 0 514 828 | 11/1992 |
| EP | 0 634 421 | 1/1995 |
| EP | 0 794 200 | 9/1997 |
| EP | 0 802 202 | 10/1997 |
| WO | WO93/19104 | 9/1993 |
| WO | WO95/00526 | 1/1995 |
| WO | WO96/33227 | 10/1996 |

(Continued)

*Primary Examiner* — Ling Choi
*Assistant Examiner* — Ronald Grinsted
(74) *Attorney, Agent, or Firm* — Priya G. Prasad

(57) ABSTRACT

This disclosure relates to a polymer composition comprising (A) a first polymer; (B) one or more fillers; and optionally (C) a cross-linking pack including cross-linking agents and coagents. The first polymer comprises at least one of (i) a propylene-based copolymer and (ii) an ethylene/$C_3$-$C_{10}$ alpha-olefin copolymer. The one or more fillers comprise at least one of carbon black, ferrite magnet powder, calcium carbonate, alumina trihydrate, magnesium hydroxide, talc, titanium dioxide, fibers, marble dust, cement dust, clay, feldspar, silica or glass, fumed silica, alumina, magnesium oxide, antimony oxide, zinc oxide, barium sulfate, calcium sulfate, aluminum silicate, calcium silicate, titanium dioxide, titanates, clay, nanoclay, organo-modified clay or nanoclay, glass microspheres, chalk, or any combination thereof. The cross-linking agents comprise organic peroxide, and the coagents comprise at least one of di- and tri-allyl cyanurates and isocyanurates, liquid and metallic multifunctional acrylates and methacrylates, zinc-based dimethacrylates and diacrylates, and functionalized polybutadiene resins.

18 Claims, No Drawings

(56) References Cited

U.S. PATENT DOCUMENTS

| | | |
|---|---|---|
| 5,436,304 A | 7/1995 | Griffin et al. |
| 5,453,471 A | 9/1995 | Bernier et al. |
| 5,462,999 A | 10/1995 | Griffin et al. |
| 5,505,172 A | 4/1996 | Heitland et al. |
| 5,616,661 A | 4/1997 | Eisinger et al. |
| 5,627,242 A | 5/1997 | Jacobsen et al. |
| 5,665,818 A | 9/1997 | Tilston et al. |
| 5,668,228 A | 9/1997 | Chinh et al. |
| 5,677,375 A | 10/1997 | Rifi et al. |
| 5,703,187 A | 12/1997 | Timmers |
| 6,034,021 A | 3/2000 | Wilson et al. |
| 7,335,696 B2 | 2/2008 | Yalvac et al. |
| 7,737,206 B2 | 6/2010 | Ouhadi |
| 2006/0100335 A1* | 5/2006 | Yalvac ................ C08K 3/0008 524/425 |
| 2006/0100377 A1 | 5/2006 | Ouhadi |

FOREIGN PATENT DOCUMENTS

| | | |
|---|---|---|
| WO | WO97/22639 | 6/1997 |
| WO | WO 01/04200 | 1/2001 |
| WO | WO03/011962 | 2/2003 |
| WO | WO2004/026957 | 4/2004 |
| WO | WO2004/099309 | 11/2004 |
| WO | WO 2005/049672 | 6/2005 |
| WO | WO 2012/039733 | 3/2012 |

* cited by examiner

HIGH FILLER LOADED POLYMER COMPOSITION

PRIORITY CLAIM

This application is a National Stage Application of International Application No. PCT/CN2010/001885, filed Nov. 24, 2010, the disclosure of which is hereby incorporated by reference in its entirety.

FIELD OF THE INVENTION

The present invention relates to polymer compositions and, in particular to thermoplastic polymer compositions with fillers highly incorporated, comprising (a) propylene-based copolymers and/or ethylene/$C_3$-$C_{10}$ alpha-olefin copolymers and (b) one or more fillers.

BACKGROUND OF THE INVENTION

Highly filled polymer compositions are used extensively in commercial applications, such as flame retardant (FR) and halogen-free flame retardant (HFFR) applications; sound management applications; flooring applications; wire and cable applications; roofing membrane applications; wall covering applications; magnetic sheet/strip applications; carpet backing; containers and automotive applications. Likewise, such highly filled polymer compositions can be used as master batch with filler highly loaded.

High melt flow rate polyolefins, such as polypropylene and polyethylene homo- and copolymers, are used in this field with the limitation of low levels of filler incorporated, poor processability, and poor mechanical properties. The homogeneity of such very high melt flow rate polyolefins incorporated with high amount of filler is generally low.

U.S. Pat. No. 7,737,206 to Trazollah Ouhadi disclosed a composition consisting essentially of a propylene copolymer, a filler, a homopolypropylene and a synthetic or natural rubber. U.S. Pat. No. 7,335,696 to Selim Yalvac et. al. disclosed a composition comprising ethylene/alpha-olefin copolymer and fillers loaded in an amount of greater than 40 percent by weight of the polymer composition.

There is, therefore, a need for a novel polymer composition suitable for the fabrication of finished articles and/or as a pigment/filler masterbatch. It would be desirable to utilize very high levels of filler for these applications, typically at least 15 wt %, preferably at least 30 wt %, more preferably at least 35 wt %, even more preferably at least 40 wt %, and if achievable, at least 55 wt % and up to 95 wt % filler, while still maintaining the balance of performance properties, such as flexibility, tensile strength, impact strength, extensibility, elongation, heat resistance, low temperature flexibility, thermoformability and thermostability during processing, and excellent dispersion performance of fillers incorporated therein, necessary to effectively fabricate the filled polymer compositions into fabricated articles.

What is desired is a polymer composition that is capable of incorporating large quantities of filler with good dispersion of fillers incorporated while simultaneously exhibiting an enhanced balance of physical and mechanical properties for the applications of interest.

SUMMARY OF THE INVENTION

In some embodiments, this disclosure relates to a polymer composition comprising:
A) a first polymer;
B) one or more fillers; and optionally
C) a cross-linking pack;
wherein the first polymer comprises at least one of:
(i) a propylene-based copolymer comprising, based on the total weight of the propylene-based copolymer, (a) at least about 60 wt % of propylene-derived units, (b) about 5 wt % to about 35 wt % of units derived from at least one of ethylene or a $C_4$-$C_{10}$ alpha-olefin, and optionally (c) about 0 to 5 wt % of diene-derived units, wherein the polypropylene-based copolymer has a heat of fusion, as determined by DSC, of about 75 J/g or less, a melting point, as determined by DSC, of about 100° C. or less, and a crystallinity of about 2% to about 65%, as determined by DSC, of isotactic polypropylene, and a melt flow rate of from 0.5 to 1,000 g/10 min measured at 230° C. and 2.16 kg weight, and
(ii) an ethylene/$C_3$-$C_{10}$ alpha-olefin copolymer having a total crystallinity as determined by DSC, of from 2 to 25% and a Brookfield viscosity of from 500 to 35,000 cP measured at 17° C.; and
wherein the one or more fillers comprise:
i) carbon black, in an amount of from greater from 50 wt % to less than or equal to 65 wt % based on the total weight of the polymer composition; or
ii) ferrite magnet powder, in an amount of less than or equal to 90 wt % based on the total weight of the polymer composition; or
iii) calcium carbonate, in an amount of from greater than 81 wt % to less than or equal to 85 wt % based on the total weight of the polymer composition; or
iv) alumina trihydrate, magnesium hydroxide, talc, titanium dioxide, natural fibers, polymeric fibers, glass fibers, marble dust cement dust, clay, feldspar, silica or glass, fumed silica, alumina, magnesium oxide, antimony oxide, zinc oxide, barium, sulfate, calcium sulfate, aluminum silicate, calcium silicate, titanium dioxide, titanates, clay, nanoclay, organo-modified clay or nanoclay, glass microspheres, mica, wollastonite, chalk, graphite, pigments, or any combination thereof, in an amount of from greater than 40 wt % to less than or equal to 80 wt % based on the total weight of the polymer composition; and wherein the cross-linking pack comprises a cross-linking agent in an amount of from 0.1 to 5 parts by weight and a coagent in an amount of from 0.1 to 10 parts by weight, based on 100 parts by weight of the first polymer; the cross-linking agent comprises an organic peroxide and the coagent comprises at least one of di- and tri-allyl cyanurates and isocyanurates, liquid and metallic multifunctional acrylates and methacrylates, zinc-based dimethacrylates and diacrylates, and functionalized polybutadiene resins.

In other embodiments, this disclosure relates to a polymer composition comprising:
A) a first polymer;
B) one or more fillers; and
C) a cross-linking pack;
wherein the first polymer comprises at least one of:
(i) a propylene-based copolymer comprising, based on the total weight of the propylene-based copolymer, (a) at least about 60 wt % of propylene-derived units, (b) about 5 wt % to about 35 wt % of units derived from at least one of ethylene or a $C_4$-$C_{10}$ alpha-olefin, and optionally (c) about 0 to 5 wt % of diene-derived units, wherein the polypropylene-based copolymer has a heat of fusion of, as determined by DSC, about 75 J/g or less, a melting point, as determined by DSC, of about 100° C. or less, and a crystallinity, as determined by DSC, of about 2% to about 65% of isotactic polypropylene, and a melt flow rate of 0.5 to 1,000 g/10 mm measured at 230° C. and 2.16 kg weight; and (ii) an ethylene/$C_3$-$C_{10}$ alpha-olefin copolymer having a total crystallinity, as determined by DSC, of 2 to 25% and a Brookfield viscosity of 500 to 35,000 cP measured at 177° C.;

wherein the one or more fillers comprise at least one of carbon black, ferrite magnet powder, calcium carbonate, alumina trihydrate, magnesium hydroxide, talc, titanium dioxide, natural fibers, polymeric fibers, glass fibers, marble dust, cement dust, clay, feldspar, silica or glass, turned silica, alumina, magnesium oxide, antimony oxide, zinc oxide, barium sulfate, calcium sulfate, aluminum silicate, calcium silicate, titanium dioxide, titanates, clay, nanoclay, organo-modified clay or nanoclay, glass microspheres, mica, wollastonite, chalk, graphite, and pigments; and wherein the cross-linking pack comprises a cross-linking agent in an amount of from 0.1 to 5 parts by weight and a coagent in an amount of from 0.1 to 10 parts by weight, based on 100 parts by weight of the first polymer; and wherein the cross-linking agent comprises an organic peroxide and the coagent comprises at least one of di- and tri-allyl cyanurates and isocyanurates, liquid and metallic multifunctional acrylates and methacrylates, zinc-based dimethacrylates and diacrylates, and functionalized polybutadiene resins.

In other embodiments, this disclosure relates to a method of making the polymer composition of this disclosure comprising the steps of mixing the first polymer with the one or more fillers, and optionally the cross-linking pack at 60 to 130° C., 40 to 100 rpm for 10 to 20 minutes, and molding at 150 to 200° C. for 3 to 40 minutes.

In yet other embodiments, this disclosure relates to a thermoplastic blend composition comprising (i) the polymer composition of this disclosure in an amount of from greater than 2 wt % to less than or equal to 40 wt % of the blend composition; and (ii) a second polymer present in an amount of from greater than or equal to 60 wt % to less than 98 wt % based on the total weight of the blend composition, wherein the second polymer includes a polypropylene having a melting point greater than or equal to 110° C.

In other embodiments, the polymer composition and/or the thermoplastic blend composition of this disclosure have applications as roofing material, wire and cable insulation or jacket, magnetic strip, carpet backing, container, film, sheet, filament, or sound deadening material.

DETAILED DESCRIPTION OF THE INVENTION

Various specific embodiments, versions of the invention will now be described, including preferred embodiments and definitions that are adopted herein. While the following detailed description gives specific preferred embodiments, those skilled in the art will appreciate that these embodiments are exemplary only, and that the invention can be practiced in other ways.

In some embodiments, this disclosure relates to a polymer composition comprising a first polymer, one or more fillers and optionally a cross-linking pack. The polymer composition of this disclosure provides enhanced balance of mechanical and physical properties, particularly, good dispersion performance of fillers incorporated.

The amount of the first polymer in the polymer composition varies from the end-use applications and the desired end-properties of the polymer composition. Not intended to be limited by any theory, it is believed that the first polymer in this disclosure serves as a binder and also provides enhanced physical properties, e.g., flexibility, tensile strength, dispersion performance etc., of the polymer composition. In some embodiments, the amount of the first polymer in the polymer composition of this disclosure is greater than about 5 wt %, greater than 10 wt %, greater than 15 wt %, greater than 20 wt %, or greater than 35 wt %, based on the total weight of the polymer composition. In other embodiments, the amount of the first polymer in the polymer composition of this disclosure is less than about 60 wt %, less than 50 wt %, less than 45 wt %, less than about 40 wt %, or less than 20 wt %, by the total weight of the polymer composition.

The amount of filler in the polymer composition varies from the type of the fillers and the desired end-use applications of the polymer composition. In some embodiments, the amount of the fillers incorporated into the polymer composition is less than about 95 wt %, less than 90 wt %, less than 85 wt %, less than 80 wt %, or less than 65 wt %, by the total weight of the polymer composition. In other embodiments, the minimum amount of the filler is greater than about 40 wt %, preferably greater than about 50 wt %, more preferably greater than about 55 wt %, even more preferably greater than 60 wt %, and most preferably greater than about 80 wt %, by the total weight of the polymer composition.

Propylene-based Copolymer

In one embodiment, the first polymer is a propylene-based copolymer which is a random copolymer having crystalline regions interrupted by non-crystalline regions. Not intended to be limited by any theory, it is believed that the non-crystalline regions may result from regions of non-crystallizable polypropylene segments and/or the inclusion of comonomer units. The crystallinity and the melting point, of the propylene-based elastomer are reduced compared to highly isotactic polypropylene by the introduction of errors (stereo and region defects) in the insertion of propylene and/or by the presence of comonomer. The propylene-based copolymer comprises propylene-derived units and units derived from at least one of ethylene or a $C_4$-$C_{10}$ alpha-olefin, and optionally a diene-derived unit. The copolymer contains at least about 60 wt % propylene-derived units by weight of the propylene-based copolymer. In some embodiments, the propylene-based copolymer is a propylene-based elastomer having limited crystallinity due to adjacent isotactic propylene units and a melting point as described herein. In other embodiments, the propylene-based copolymer is generally devoid of any substantial intermolecular heterogeneity in tacticity and comonomer composition, and also generally devoid of any substantial heterogeneity in intramolecular composition distribution.

The propylene-based copolymer contains greater than about 50 wt %, preferably greater than about 60 wt %, more preferably greater than about 65 wt %, even more preferably greater than about 75 wt % and up to about 99 wt % propylene-derived units, based on the total weight of the propylene-based copolymer. In some preferable embodiments, the propylene-based copolymer includes propylene-derived units in an amount based on the weight of propylene-based copolymer of from about 75 wt % to about 95 wt %, more preferably about 75 wt % to about 92.5 wt %, and even more preferably about 82.5 wt % to about 92.5 wt %, and most preferably about 82.5 wt % to about 90 wt %. Correspondingly, the units, or comonomers, derived from at least one of ethylene or a $C_4$-$C_{10}$ alpha-olefin may be present in an amount of about 1 wt % to about 35 wt %, or preferably about 5 wt % to about 35 wt %, more preferably about 5 wt % to about 25 wt %, even more preferably about 75 wt % to about 25 wt %, even more preferably about 75 wt % to about 20 wt %, even more preferably from about 8 wt % to about 17.5 wt %, and most preferably about 10 wt % to 17.5 wt %, based on the total weight of the propylene-based copolymer.

The comonomer content may be adjusted so that the propylene-based copolymer having a heat of fusion of about 75 J/g or less, melting point of about 100° C. or less, and crystallinity of about 2% to about 65% of isotactic polypropylene, and preferably a melt flow rate ("MFR"), as measured at 230° C. and 2.16 kg weight, of less than 800 g/10 mm.

The propylene-based copolymer may comprise more than one comonomer. Preferred embodiments of a propylene-based copolymer have more than one comonomer include propylene-ethylene-octene, propylene-ethylene-hexene, and propylene-ethylene-butene copolymers.

In some embodiments where more than one comonomers derived from at least one of ethylene or a $C_4$-$C_{10}$ alpha-olefin are present, the amount of each comonomer may be less than about 5 wt % of the propylene-based copolymer, but the combined amount of comonomers by weight of the propylene-based copolymer is about 5 wt % or greater.

In preferred embodiments, the comonomer is ethylene, 1-hexene, or 1-octene, and preferably in an amount of about 5 wt % to about 25 wt %, about 5 wt % to about 20 wt %, about 5 wt % to about 16 wt %, about 6 wt % to about 18 wt %, or in some embodiments about 8 wt % to about 20 wt % based on the weight of the propylene-based copolymer.

In one embodiment, the propylene-based copolymer comprises ethylene-derived units. The propylene-based copolymer may comprise about 5 wt % to about 35 wt %, preferably about 5 wt % to about 25 wt %, about 7.5 wt % to about 20 wt %, or about 10 wt % to about 17.5 wt %, of ethylene-derived units by weight of the propylene-based copolymer. In some embodiments, the propylene-based copolymer consists essentially of units derived from propylene and ethylene, i.e., the propylene-based copolymer does not contain any other comonomer in an amount typically present as impurities in the ethylene and/or propylene feedstreams used during polymerization or an amount that would materially affect the beat of fusion, melting point, crystallinity, or melt flow rate of the propylene-based copolymer, or any other comonomer intentionally added to the polymerization process.

In some embodiments, diene comonomer units are included in the propylene-based copolymer. Examples of the diene include, but not limited to, 5-ethylidene-2-norbornene, 5-vinyl-2-norbornene, divinyl benzene, 1, 4-hexadiene, 5-methylene-2-norbornene, 1, 6-octadiene, 5-methyl-1, 4-hexadiene, 3, 7-dimethyl-1, 6-octadiene, 1, 3-cyclopentadiene, 1, 4-cyclohexadiene, dicyclopentadiene, or a combination thereof. The amount of diene comonomer is equal to or more than 0 wt %, or 0.5 wt %, or 1 wt %, or 1.5 wt % and lower than, or equal to, 5 wt %, or 4 wt %, or 3 wt % or 2 wt % based on the weight of propylene-based copolymer.

The propylene-based copolymer has a heat of fusion ("$H_f$"), as determined by the Differential Scanning Calorimetry ("DSC"), of about 75 J/g or less, about 70 J/g or less, about 50 J/g or less, or about 35 J/g or less. The propylene-based copolymer may have a lower limit $H_f$ of about 0.5 J/g, about 1 J/g, or about 5 J/g. For example, use in value may be anywhere from 1.0, 1.5, 3.0, 4.0, 6.0, or 7.0 J/g, to 30, 35, 40, 50, 60, 70, or 75 J/g.

The propylene-based copolymer may have a percent crystallinity, as determined according to the DSC procedure described herein, of about 2% to about 65%, preferably about 0.5% to about 40%, preferably about 1% to about 30%, and more preferably about 5% to about 35%, of isotactic polypropylene. The thermal energy for the highest order of propylene (i.e., 100% crystallinity) is estimated at 189 J/g. In some embodiments, the copolymer has a crystallinity in the range of about 0.25% to about 25%, or about 0.5% to about 22% of isotactic polypropylene.

In some embodiments, the propylene-derived units of the propylene-based copolymer have an isotactic triad fraction of about 50% to about 99%, more preferably about 65% to about 97% and more preferably about 75% to about 97%. In other embodiment, the first polymer has a triad tacticity as measured by $^{13}C$ NMR, of about 75% or greater, about 80% or greater, about 82% or greater, about 85% or greater, or about 90% or greater.

The triad tacticity of a polymer is the relative tacticity of a sequence of three adjacent propylene units, a chain consisting of head to tail bonds, expressed as a binary combination of m and r sequences. It is usually expressed as the ratio of the number of units of the specified tacticity to all of the propylene triads in the first polymer. The triad tacticity (mm fraction) of a propylene copolymer can be determined from a $^{13}C$ NMR spectrum of the propylene copolymer. The calculation of the triad tacticity is described in the U.S. Pat. No. 5,504,172, the entire contents of which are incorporated herein by reference.

The propylene-based copolymer may have a single peak melting transition as determined by DSC. In one embodiment, the copolymer has a primary peak transition of about 90° C. or less, with a broad end-of-melt transition of about 110° C. or greater. The peak "melting point" ("$T_m$") is defined as the temperature of the greatest heat absorption within the range of melting of the sample. However, the copolymer may show secondary melting peaks adjacent to the principal peak, and/or at the end-of-melt transition. For the purposes of this disclosure, such secondary melting peaks are considered together as a single melting point, with the highest of these peaks being considered the Tm of the propylene-based copolymer. The propylene-based copolymer may have a Tm of about 100° C. or less, about 90° C. or less, about 80° C. or less, or about 70° C. or less. In one embodiment, the propylene-based copolymer has a Tm of about 25° C. to about 100° C., about 25° C. to about 85° C., about 25° C. to about 75° C., or about 25° C. to about 65° C. In some embodiments, the propylene-based copolymer has a Tm of about 30° C. to about 80° C., preferably about 30° C. to 70° C.

Differential scanning calorimetric ("DSC") data was obtained using a Perkin-Elmer DSC 7. About 5 mg to about 10 mg of a sheet of the polymer to be tested was pressed at approximately 200° C. to 230° C., then removed with a punch die and annealed at room temperature for 48 hours. The samples were then sealed in aluminum sample pans. The DSC data was recorded by first cooling the sample to −50° C. and then gradually heating it to 200° C. at a rate of 10° C./minute. The sample was kept at 200° C. for 5 minutes before a second cooling-heating cycle was applied. Both the first and second cycle thermal events were recorded. Areas under the melting curves were measured and used to determine the heat of fusion and the degree of crystallinity. The percent crystallinity (X %) was calculated using the formula, X %=[area under the curve (Joules/gram)/B(Joules/gram)] *100, where B is the heat of fusion for the homopolymer of the major monomer component. These values for B were found from the Polymer Handbook, Fourth Edition, published by John Wiley and Sons, New York 1999. A value of 189 J/g (B) was used as the heat of fusion for 100% crystalline polypropylene. The melting temperature was measured and reported during the second heating cycle (or second melt).

In one or more embodiments, the propylene-based elastomer may have a Mooney viscosity [ML (1+4)@125° C.], as determined according to ASTM D-1646, of less than 100, in other embodiments less than 75, in other embodiments less than 60, and in other embodiments less than 30.

The propylene-based copolymer may have a density of about 0.850 g/cm$^3$ to about 0.920 g/cm$^3$, about 0.860 g/cm$^3$ to about 0.900 g/cm$^3$, preferably about 0.860 g/cm$^3$ to about 0.890 g/cm$^3$, at room temperature as measured per ASTM D-1505.

The first polymer preferably has a melt flow rate ("MFR") greater than 0.5 g/10 min, and less than or equal to about 1,000 g/10 min. or less than or equal to about 800 g/10 min, more preferably less than or equal us about 500 g/10 min, more preferably less than or equal to 200 g/10 min, more preferably less than or equal to about 100 g/10 min, more preferably less than or equal to about 50 g/10 min. Particularly preferred embodiments include a propylene-based copolymer with an MFR of less than or equal to about 25 g/10 min, such as from about 1 to about 25 g/10 min. more preferably about 1 to about 20 g/10 min. The MFR is determined according to ASTM D-1238, condition L (2.16 kg, 230° C.).

The propylene-based copolymer may have a weight average molecular weight ("Mw") of about 5,000 to about 5,000,000 g/mole, preferably about 10,000 to about 1,000,000 g/mole, and more preferably about 50,000 to about 400,000 g/mole; a number average molecular weight ("Mn") of about 2,500 to about 2,500,000 g/mole, preferably about 10,000 to about 250,000 g/mole, and more preferably about 25,000 to about 200,000 g/mole; and/or a z-average molecular weight ("Mz") of about 10,000 to about 7,000,000 g/mole, preferably about 80,000 to about 700,000 g/mole, and more preferably about 100,000 to about 500,000 g/mole. The propylene-based copolymer may have a molecular weight distribution ("MWD") of about 1.5 to about 20, or about 1.5 to about 15, preferably about 1.5 to about 5, and more preferably about 1.8 to about 5, and most preferably about 1.8 to about 4.

The propylene-based copolymer may have an Elongation at Break of less than about 2000%, less than about 1000%, or less than about 800%, as measured per ASTM D412.

This disclosure is not limited by any particular polymerization method for preparing the propylene-based copolymer.

General process conditions may be found in U.S. Pat. No. 5,001,205, PCT publications WO 96/33227 and WO 97/22639, entire content U.S. Pat. Nos. 4,543,399, 4,588,790, 5,028,670, 5,317,036, 5,352,749, 5,405,922, 5,436,304, 5,453,471, 5,462,999, 5,016,661, 5,627,242, 5,665,818, 5,668,228, and 5,677,375, and European publications EP-A-0 794 200, EP-A-0 802 202 and EP-B-634 421, the entire contents of which are incorporated herein by reference.

Ethylene/C$_3$-C$_{10}$ Alpha-Olefin Copolymer

In one embodiment, the first polymer is an ethylene/C$_3$-C$_{10}$ alpha-olefin copolymer.

The C$_3$-C$_{10}$ alpha-olefin is preferably at least one of propylene, isobutylene, 1-butene, 1-pentene, 1-hexene, 3-methyl-1-pentene, 4-methyl-1-pentene, 1-hexene, and 1-octene. More preferably the C$_3$-C$_{10}$ alpha-olefin is t least one of propylene, isobutylene, 1-butene, 1-pentene, 1-hexene, and 1-octene. Most preferably the C$_3$-C$_{10}$ alpha-olefin is propylene.

In some embodiments, the amount of ethylene-derived unit in the ethylene/C$_3$-C$_{10}$ alpha-olefin copolymer is not limited to any specific ranges as long as the ethylene/C$_3$-C$_{10}$ alpha-olefin copolymer has a low viscosity and a low crystallinity.

The density of the ethylene/C$_3$-C$_{10}$ alpha-olefin of the present disclosure preferably ranges from about 0.865 g/cm$^3$ to about 0.885 g/cm$^3$ as measured in accordance with ASTM D-792. The melting point of the ethylene/C$_3$-C$_{10}$ alpha-olefin copolymer is preferably less than 65° C., and more preferably less than 60° C.

The crystallinity data disclosed in this disclosure was determined by Differential Scanning Calorimetry ("DSC"). The sample was heated to 180° C. and maintained at that temperature for three minutes, then cooled at 10° C./min to −90° C., and then heated at 10° C./min to 150° C. The melting temperatures and crystallinity data were measured using the second heat curve. The ethylene/C$_3$-C$_{10}$ alpha-olefin according to the present disclosure has a low crystallinity in the range from 2% to 25%, preferably from 3.5% to 25%, more preferably from 3.5% to 20%, and most preferably from 5% to 20%.

The Brookfield viscosity was determined in accordance with the following procedure. A Brookfield Laboratories DVII+ Viscometer was used with disposable aluminum sample chambers. The spindle used was a SC-31 hot-melt spindle. The sample was poured in the chamber, then inserted into a Brookfield Thermosel and locked with bent needle-nose pliers. The sample chamber has a notch on the bottom to prevent the chamber from turning when the spindle is inserted and spinning. The sample was heated to the required temperature with additional sample being added until the melted sample was about 1 inch below the top of the sample chamber. The viscometer apparatus was lowered and the spindle submerged into the sample chamber. Lowering was continued until brackets on the viscometer align on the Thermosel. The viscometer is turned on, and set to a shear rate which leads to a torque reading in the range of 30 to 60 percent. Readings were taken every minute for about 15 minutes, or until the reading stabilized and then the final reading was recorded. The ethylene/C$_3$-C$_{10}$ alpha-olefin has a low viscosity ranging from 1,000 to 35,000, preferably from 2,000 to 30,000, more preferably from 3,000 to 20,000 cP at 177° C.

The ethylene/C$_3$-C$_{10}$ alpha-olefin copolymer, its preparation methods and catalyst used are disclosed in U.S. Pat. Nos. 5,064,802; 5,132,380; 5,703,187; 6,034,021, EP 0 468 651, EP 0 514 823, WO 93/19104, WO 95/00526, U.S. Pat. Nos. 4,044,438; 5,057,475; 5,096,867; and 5,324,800.

In some embodiments, the first polymer may comprise both propylene-based copolymer and ethylene/C$_3$-C$_{10}$ alpha-olefin copolymer.

Preferred examples of first polymer are available commercially under the trade names VISTAMAXX™ (ExxonMobil Chemical Company, Houston, Tex., USA), VERSIFY™ (The Dow Chemical Company, Midland, Mich., USA), TAFMER™ XM (Mitsui Chemicals, Inc., Tokyo, Japan), or L-MODU™ (Idemitsu Kosan Co., Ltd., Tokyo, Japan). The particular grade(s) of commercially available propylene-based copolymer or ethylene//C$_3$-C$_{10}$ alpha-olefin suitable for use in this disclosure can be readily determined using methods commonly known in the art.

Filler

The fillers of this disclosure may be either solid inorganic fillers and/or solid organic fillers. The term "filler" encompasses both pigments and additives such as, for instance, flame retardants. The term "solid" as sued herein means that a material is solid at temperatures of up to about 40° C.

Representative organic fillers include such materials as cellulose, starch, organic pigments such as color concentrates, organic UV-stabilizers, organic heat-stabilizers, organic flame retardants such as halogenated, for instance, bromine containing flame retardants, flour, wood flour, natural fibers, and polymeric fibers like polyester-based, polyamide-based materials, ammonium octamolybdate and intumescent compounds.

Inorganic fillers are the preferred fillers for use in this disclosure. Preferred examples of inorganic fillers are talc, graphite, calcium carbonate, glass fibers, marble dust, cement dust, clay, feldspar, silica or glass, fumed silica, alumina, magnesium oxide, antimony oxide, zinc oxide, barium sulfate, silicones calcium, sulfate, aluminum silicate, calcium silicate, titanium dioxide, titanates, clay, nanoclay, organo-modified clay or nanoclay, glass microspheres, mica, wollastonite, inorganic pigments, and chalk. Of these fillers, barium sulfate, talc, calcium carbonate, silica/glass, glass fibers, alumina, aluminum trihydroxide, magnesium hydroxide and titanium dioxide, and mixtures thereof are preferred. The most preferred inorganic fillers are talc, magnesium hydroxide, aluminum trihydroxide, calcium carbonate, barium sulfate, glass fibers or mixtures thereon. For flame resistance applications, the preferred flame-retardant fillers include magnesium hydroxide, aluminum trihydroxide (also referred to as alumina trihydrate) and mixtures of two or more of these materials, red amorphous phosphorous, polyphosphates, alkyl phosphates, alkyl phosphonates, amine phosphates, aminoalkyl phosphates, ammonium phosphates, ammonium polyphosphates, antimony oxide, and zinc borates.

In some embodiments of this disclosure the amount of filler present in the polymer composition is at least about 40 wt %, at least about 42 wt %, at least 50 wt %, at least about 52 wt %, at least about 60 wt %, at least about 82 wt % or at least about 89 wt %, based on this total amount of the polymer composition and depending on the type of filler used and the end use applications. In particular, the minimum amount of calcium carbonate according to the present disclosure is about 40 wt %, 60 wt %, 70 wt %, 75 wt %, 71 wt %, 80 wt %, 81 wt %, or 82 wt %, based on the total amount of the polymer composition. The minimum amount of carbon black according to the present disclosure is about 30 wt %, 40 wt %, 45 wt %, 48 wt %, 50 wt %, or 51 wt %, based on the total amount of the polymer composition. The minimum amount of titanium dioxide according to the present disclosure is about 40 wt %, 50 wt %, 55 wt %, 58 wt %, 60 wt %, or 61 wt %, based on the total amount of the polymer composition. The minimum amount of magnet fertile powder according to the present disclosure is about 40 wt %, 50 wt %, 60 wt %, 65 wt %, 68 wt %, or 70 wt %, based on the total amount of the polymer composition. The minimum amount of aluminum trihydroxide or magnesium hydroxide according to the present disclosure is about 40 wt %, 50 wt %, 55 wt %, 58 wt %, 60 wt %, or 61 wt %, based on the total amount of the polymer composition.

The maximum amount of filler incorporated in the polymer composition while maintaining the balanced mechanical and physical properties, including tensile strength, flexibility, elongation, dispersion performance, etc, varies from the desired end-use and depends on the type of fillers incorporated into the polymer composition. In particular, the maximum amount of calcium carbonate according to the present disclosure is 95 wt %, 92.5 wt %, 90 wt %, 88 wt %, 86 wt %, 85 wt %, or 84 wt %, based on the total amount of the polymer composition. The maximum amount of carbon black according to the present disclosure is about 65 wt %, 62.5 wt %, 61 wt %, or 60 wt %, based on the total amount of the polymer composition. The maximum amount of titanium dioxide according to the present disclosure is about 90 wt %, 88 wt %, 85 wt %, 83 wt %, 82 wt %, 81 wt %, 80 wt %, or 78 wt %, based on the total amount of the polymer composition. The maximum amount of magnet ferrite powder according to the present disclosure is about 95 wt %, 94 wt %, 93 wt %, 92 wt %, 91 wt %, 90 wt %, or 89 wt %, based on the total amount of the polymer composition. The maximum amount of aluminum trihydroxide or magnesium hydroxide according to the present disclosure is about 90 wt %, 88 wt %, 85 wt %, 83 wt %, 82 wt %, 81 wt %, 80 wt %, or 78 wt %, based on the total amount of the polymer composition.

For some applications the use of two or more fillers is preferred. Examples of useful filler blends include any combination of carbon black, ferrite magnet powder, calcium carbonate, alumina trihydrate, magnesium hydroxide, talc, titanium dioxide, glass fibers, marble dust, cement dust, clay, feldspar, silica or glass, fumed silica, alumina, magnesium oxide, antimony oxide, zinc oxide, barium sulfate, calcium sulfate, aluminum silicate, calcium silicate, titanium dioxide, titanates, clay, nanoclay, organo-modified clay or nanoclay, glass microspheres, and chalk; for example, barium sulfate and calcium carbonate for sound barriers, carbon black and calcium carbonate and/or talc for conductive flooring, magnet powder and calcium carbonate and/or talc for magnetic strip/sheet. The amount of filler blend present in the polymer composition is at least about 5 wt %, at least about 10 wt %, at least about 20 wt %, at least about 30 wt %, at least about 40 wt %, at least about 41 wt %, at least about 42 wt %, at least 50 wt %, at least about 52 wt %, at least about 60 wt %, at least about 82 wt % and at least about 89 wt %, based on the total amount of the polymer composition and depending on the type of filler used and the end use applications. The amount of filler blend present in the polymer composition is less than about 95 wt %, less than about 90 wt %, less than about 85 wt %, less than about 80 wt %, leas than about 75 wt %, or less than about 60 wt %, based on the total amount of the polymer composition and depending on the type of filler used and the end use applications.

In particular, when carbon black is mixed with one or more of calcium carbonate, ferrite magnet powder, alumina trihydrate, magnesium hydroxide, talc, titanium dioxide, glass fibers, natural fibers, polymeric fibers, marble dust, cement dust, clay, feldspar, silica or glass, fumed silica, alumina, magnesium oxide, antimony oxide, zinc oxide, barium, sulfate, calcium sulfate, aluminum silicate, calcium silicate, titanium dioxide, titanates, clay, nanoclay, organo-modified clay or nanoclay, glass microspheres, mica, wallastonite, chalk, graphite and pigments, the minimum total content of the two or more fillers based on the total weight of the polymer composition is 51 wt %, 55 wt %, 60 wt %, 65 wt %, 70 wt %, 75 wt %, 80 wt %, 85 wt %, or 90 wt %; and the maximum total content of fillers based on the total weight of the polymer composition is 99 wt %, 95 wt %, 90 wt % 86 wt %, 81 wt %, 76 wt %, 71 wt %, 66 wt %, 61 wt %, 56 wt %, or 51 wt %, so long as the minimum total amount is less than or equal to the maximum total amount. When ferrite magnet powder is mixed with one or more of calcium carbonate, carbon black, alumina trihydrate, magnesium, hydroxide, talc, titanium dioxide, glass fibers, natural ethers, polymeric fibers, marble dust, cement dust, clay, feldspar, silica or glass, fumed silica, alumina, magnesium oxide, antimony oxide, zinc oxide, barium sulfate, calcium sulfate, aluminum silicate, calcium silicate, titanium dioxide, titanates, clay, nanoclay, organo-modified clay or nanoclay, glass microspheres, mica, wallastonite, chalk, graphite and pigments, the minimum total content of the two or more fillers based on the total weight of the polymer composition is 10 wt %, 20 wt %, 30 wt %, 40 wt %, 50 wt %, 60 wt %, 70 wt %, 80 wt %, or 90 wt %; and the maximum total content of fillers based on the total weight of the polymer composition is 99 wt %, 95 wt %, 90 wt %, 81 wt %, 71 wt %, 61 wt %, 51 wt %, 41 wt %, 31 wt %, or 21 wt %, so long as the minimum total amount is less than or equal to the maximum total amount. When calcium carbonate is mixed with one or more of ferrite magnet powder, carbon blank, alumina trihydrate, magnesium hydroxide, talc, titanium dioxide, glass fibers, natural fibers, polymeric fibers, marble dust, cement dust, clay, feldspar, silica or glass, fumed silica, alumina, magnesium oxide, antimony oxide, zinc oxide, barium sulfate, calcium sulfate, aluminum silicate, calcium silicate, titanium dioxide, titanates, clay, nanoclay, organo-modified clay or nanoclay, glass microspheres, mica, wallastonite, chalk, graphite and pigments, the minimum total content of the two or more fillers based on the total weight of the polymer composition is 81 wt %, 82 wt %, 83 wt %, 85 wt %, 88 wt %, 90 wt %, 93 wt %, or 95 wt %; and the maximum total content of fillets based on the total weight of the polymer composition is 99 wt %, 95 wt %, 90 wt %, 89 wt %, 86 wt %, 84 wt %, 83 wt %, or 82 wt %, s long as the minimum total amount is less than or equal to the maximum total amount.

Cross-linking Pack

Optionally, in some embodiments, the polymer composition of this disclosure further comprises a cross-linking pack including a cross-linking agent and a coagent. Not intended to be limited by any theory, it is believed that the addition of cross-linking agents may create cross links between the plastic and rubber phases, which improves the physical properties of the innovated crosslinked polymer composition of this disclosure. Suitable cross-linking agents are organic peroxides including both alkyl and aralkyl peroxides. Examples include, but are not limited to, dicumylperoxide; ("DCP"), 2,5-dimethyl-2,5-di(t-butylperoxy)hexane, 1,1-bis(t-butylperoxy)-3,3,5-trimethylcyclohexane, 1,1-di-(t-butylperoxy)-cyclohexane, 2,2'-bis(t-butylperoxy) diisopropylbenzene, α,α-bis(tert-butylperoxy) diisopropyl benzene, 4,4'-bis(t-butylperoxy)butylvalerate, t-butyl-perbenzoate, t-butylperterephthalate, t-butyl peroxide, benzoyl peroxide, cumene hydroperoxide, t-butyl peroctoate, methyl ethyl ketone peroxide, lauryl peroxide, and tert-butyl peracetate. Also, diaryl peroxides, ketone peroxides, peroxydicarbonates, peroxyesters, dialkyl peroxides, hydroperoxides, peroxyketals and mixtures thereof may be used. The amount of organic peroxide is more than, or equal to, 0.1 parts by weight, or 0.5 parts by weight, or 0.8 parts by weight and less than, or equal to, 5 parts by weight, or 4 parts by weight, or 3 parts by weight based on 100 parts by weight of the first polymer.

The addition of the co-agent may enhance the effectiveness of the cross-linking. Suitable coagents include di- and tri-allyl cyanurates and isocyanurates, liquid and metallic multifunctional acrylates and methacrylates, zinc-based dimethacrylates and diacrylates, and functionalized polybutadiene resins. The amount of organic peroxide is more than, or equal to, 0.1 parts by weight, 0.5 parts by weight, or 1 parts by weight and less than, or equal, to, 10 parts by weight, 8 parts by weight, or 5 parts by weight based on 100 parts by weight of the first polymer.

Second Polymer

In other embodiments, this disclosure relates a thermoplastic blend composition comprising (i) the polymer composition of this disclosure in an amount of from great than 2 wt % to less than or equal to 40 wt % of the blend composition; and (ii) a second polymer present in an amount of from greater than or equal to 60 wt % to less than 98 wt % based on the total weight of the blend composition, wherein the second polymer includes a polypropylene having a melting point ("Tm") greater than or equal to 110° C., as determined by DSC.

The second polymer may be at least one of a propylene homopolymer or propylene copolymer. In embodiments where the additional polymer includes a propylene copolymer, and the propylene copolymer may be a graft copolymer, block copolymer, or random copolymer.

The amount of second polymer combined into the thermoplastic blend composition is up to 98 wt %, 95 wt %, 90 wt %, or 85 wt % and not less than 58 wt %, not less than 60 wt %, not less than 65 wt %, or not less than 70 wt % based on the weight of the thermoplastic blend composition.

The second polymer includes a polypropylene having a melting point ("Tm") greater than or equal to 110° C., greater than or equal to 115° C., or greater than or equal to 130° C., and a heat of fusion, as determined by DSC, of at least 60 J/g, or at least 70 J/g, or at least 80 J/g.

The amount of propylene-derived units present in the second polymer may be at least about 90 wt %, at least about 92 wt %, at least about 95 wt %, at least about 97 wt %, or about 100 wt %, based on the total weight of the second polymer.

In some embodiments, the second polymer includes a random copolymer of propylene and at least one comonomer selected from at least one of ethylene and $C_4$-$C_{12}$ alpha-olefins. In a particular aspect, the amount of comonomer has an upper limit of about 9 wt %, about 8 wt %, or about 6 wt %, and a lower limit of about 2 wt %, based on the total weight of the second polymer.

In one embodiment, the second polymer includes a copolymer of ethylene, an alpha-olefin, and a diene. The amount of ethylene-derived units in the copolymer may be 50 mol % or greater. In one embodiment, the copolymer is an ethylene-hexene copolymer. In another embodiment the copolymer is a copolymer of ethylene, propylene, and diene known as EFDM. In a particular aspect of this embodiment, the amount of propylene derived units in the copolymer is 40 mol % or greater.

Other Additives

As will be evident to those skilled in the art, the polymer compositions of the present disclosure may comprise other additives in addition to the first polymer and fillers as described above. Various additives may be present to enhance a specific property or may be present as a result of processing of the individual components. Additives which may be incorporated include, but are not limited to processing oils, fire retardants, antioxidants, plasticizers, vulcanizing or curative agents, vulcanizing or curative accelerators, cure retarders, processing aids, tackifying resins, flow improvers, silane coupling agent and the like. Antiblocking agents, coloring agents, lubricants, mold release agents, nucleating agents, reinforcements, and other fillers (including granular, fibrous, or powder-like) may also be employed. Nucleating agents may improve the rigidity of the article. The list described herein is not intended to be inclusive of all types of other additives which may be employed with the present disclosure. Those of skill in the art will appreciate that other additives may be employed to enhance properties of the polymer composition. As is understood by those skilled in the art, fire polymer compositions of the present disclosure may be modified to adjust the characteristics of the blend as desired.

The polymer compositions described herein may contain process oil in the range of from 0 to 500 parts by weight, from 2 to 200 parts by weight, from 5 to 1.50 parts by weight, or from 10 to 100 parts by weight per 100 parts of first polymer. The addition of process oil in moderate amounts may lower the viscosity and flexibility of the blend while improving the properties of the blend at temperatures near and below 0° C. It is believed that those potential benefits arise by the lowering of the glass transition temperature ("Tg") of the blend. Adding process oil to the blend may also improve processability and provide a better balance of elastic and tensile strength. The process oil is typically known as extender oil in rubber applications. Process oils include hydrocarbons having either (a) traces of hetero atoms such oxygen or (b) at least one hetero atom such as dioctyl plithalate, ethers, and polyethers. Process oils have a boiling point to be substantially involatile at 200° C. These process oils are commonly available either as neat solids, liquids, or as physically absorbed mixtures of these materials on an inert support (e.g., clay, silica) to form a free flowing powder. Process oils usually include a mixture of a large number of chemical compounds which may consist of linear, acyclic but branched, cyclic, and aromatic carbonaceous structures. Another family of process oils are certain organic esters and alkyl ether esters having a molecular weight ("Mn") less than 10,000. Combinations of process oils may also be used in the practice of this disclosure. The process oil should be compatible or miscible with the polymer blend composition in the melt, and may be substantially miscible in the propylene-based elastomer at room temperature. Process oils may be added to the blend compositions by any of the conventional means known in the art, including the addition of all or part of the process oil prior to recovery of the polymer, and addition of all or part of the process oil to the polymer as a part of a compounding for the interblending of the propylene-based elastomer. The compounding step may be carried out in a batch mixer, such as a mill, or an internal mixer, such as a Banbury mixer. The compounding operation may also be conducted in a continuous process, such as a twin screw extruder. The addition of process oils to lower the glass transition temperature of blends of isotactic polypropylene and ethylene propylene diene rubber is described in U.S. Pat. Nos. 5,290,886 and 5,397,832, the disclosures of which are hereby incorporated herein by reference.

The addition of process aids, such as a mixture of fatty acid ester or calcium fatty acid soap bound on a mineral filler, to the polymer compositions described herein may help the mixing of the polymer composition and the injection of the polymer composition into a mold. Other examples of process aids are low molecular weight polyethylene copolymer wax and paraffin wax. The amount of process aid used may be within the range of from 0.5 to 5 parts by weight based on the total weight of the polymer composition.

Adding antioxidants to the polymer compositions described herein may improve the long term aging. Examples of antioxidants include, but are not limited to quinolein, e.g., trimethylhydroxyquinolein (TMQ); imidazole, e.g., zincmercapto toluyl imidazole (ZMTI); and conventional antioxidants, such as hindered phenols, lactones, and phosphites. The amount of antioxidants used may be within the range of from 0.001 to 5 parts by weight based on the total weight of the polymer composition.

Method of Making

The polymer compositions according to this disclosure may be compounded by any convenient method, such as dry blending of the first polymer, the filler(s) and optionally the cross-linking pack and other additives, and subsequently melt-mixing at a temperature above the melting temperature of the thermoplastic component either directly in an extruder used to make the finished article, or by pre-melt mixing in a separate extruder (for example, a Banbury mixer). Dry blends of the polymer compositions can also be directly injection molded without pre-melt mixture. Examples of machinery capable of generating the shear and mixing include extruders with kneaders or mixing elements with one or more mixing tips or flights, extruders with one or more screws, extruders of co- or counter-rotating type, Banbury mixer. Farrell Continuous mixer, and the Buss Kneader. The type and intensity of mixing temperature, and residence time required can be achieved by the choice of one of the above machines in combination with the selection of kneading or mixing elements, screw design, and screw speed (<3000 rpm). Typically the temperature for melt-mixing is from 60° C. to 130° C., and the residence time is from 10 to 20 minutes.

The blend may contain additives, which can be introduced into the polymer composition at the same time as the other components or later at down stream in case of using an extruder or Buss kneader or only later in time. The additives can be added to the blend in pure form or in masterbatches. The process oil or plasticizer can be added in one addition or in multiple additions. Preferably, the plasticizers are added after sufficient molten-state mixing of the polymer component and the optional one or more second polymers. Alternatively, the first polymer and the cross-linking pack, if present, may be blended prior to the incorporation of the filler. The blend can either be a physical blend or an in-reactor blend manufactured by in-reactor processes as known to those of ordinary skill in the art. The polymer compositions can be processed to fabricate articles by any suitable means known in the art. For example, the polymer compositions can be processed to films or sheets or to one or more layers of a multi-layered structure by known processes, such as calendering, casting or co-extrusion. Injection molded, compression molded, extruded or blow molded parts can also be prepared from the polymer compositions of the present disclosure. Typically the temperature for molding is higher than that for melt-mixing, and is preferably from 60 to 130° C., and the residence time is preferably 3 to 42 minutes. Alternatively, the polymer compositions can be processed by profile extrusion processes to make articles, such as wire and cable, magnetic strip, pipe and timing, gaskets, molded articles, carpet backing, containers and floorings. The extrudate can also be milled, chopped, granulated or pelletized.

The polymer compositions of this disclosure are also useful in the preparation of masterbatches. For example, the addition of pigment or color concentrates to a polymer is often through the use of a masterbatch. In this example, a first polymer is highly filled with the filler/pigment or concentrate to form a masterbatch. Then the masterbatch is added to a second polymer to be colored. The compositions of this disclosure can contain more pigment or colorant than conventional compositions.

Applications

This disclosure encompasses a roofing material, wire and cable insulation or jackets, magnetic strip, carpet backing, container, film, sheet, filament or sound deadening materials, produced using the polymer compositions or thermoplastic blend compositions. Methods of their manufacturing are commonly known in the art and can be found, for example, in U.S. Pat. No. 4,241,123. Non-limiting specific examples will be illustrated in the below.

Additional Embodiments of this Disclosure

Some other embodiments are also included in this discourse as follows.

In the first aspect, this disclosure provides a polymer composition comprising:
A) a first polymer;
B) one or more fillers; and
C) a cross-linking pack;
wherein the first polymer comprises at least one of
(i) a propylene-based copolymer comprising, based on the total weight of the propylene-based copolymer, (a) at least about 60 wt % of propylene-derived units, (b) about 5 wt % to about 35 wt % of units derived from at least one of ethylene or a $C_4$-$C_{10}$ alpha-olefin, and optionally (c) about 0 to 5 wt % of diene-derived units, wherein the polypropylene-based copolymer has a heat of fusion, as determined by DSC, of about 75 J/g or less, a melting point, as determined by DSC, of about 100° C. or less, and a crystallinity, as determined by DSC, of about 2% to about 65% of isotactic polypropylene, and a melt flow rate from 0.5 to 1,000 g/10 min measured at 230° C. and 5 kg weight; and
(ii) an ethylene/$C_3$-$C_{10}$ alpha-olefin copolymer having a total crystallinity, as determined by DSC, of from 2% to 25% and a Brookfield viscosity from 500 to 35,000 cP measured at 177° C.;
wherein the one or more fillers comprise at least one of carbon black, ferrite magnet powder, calcium carbonate, alumina trihydrate, magnesium hydroxide, talc, titanium dioxide, natural fibers, polymeric fibers, glass fibers, marble dust, cement dust, clay, feldspar, silica or glass, fumed silica, alumina, magnesium oxide, antimony oxide, zinc oxide, barium sulfate, calcium sulfate, aluminum silicate, calcium silicate, titanium, dioxide, titanates, clay, nanoclay, organo-modified clay or nanoclay, glass microspheres, mica, wollastonite, chalk, graphite, or pigments; and
wherein the cross-linking pack comprises a cross-linking agent in an amount of from 0.1 to 5 parts by weight, and a coagent in an amount of front 0.1 to 10 parts by weight, based on 1.00 parts by weight of the propylene-based copolymer, and wherein the cross-linking agent comprises an organic peroxide and the coagent comprises at least one of di- and tri-allyl cyanurates and isocyanurates, liquid and metallic multifunctional acrylates and methacrylates, zinc-based dimethacrylates and diacrylates, and functionalized polybutadiene resins.

In the second aspect, the polymer composition according to the first aspect is characterized, in that the propylene-based copolymer comprises, based on the weight of the propylene-based copolymer, (a) at least about 75 wt % to 95 wt % of propylene-derived units, (b) about 5 wt % to 25 wt % of units derived from at least one of ethylene or a $C_4$-$C_{10}$ alpha-olefin, and optionally (c) about 0 to 4 wt % of diene-derived units, wherein the polypropylene-based copolymer has a triad tacticity, as determined by $^{13}C$ NMR, of from about 50% to about 99%, and a melt flow rate less than or equal to about 800 g/10 min measured at 230° C. and 2.16 kg weight.

In the third aspect, the polymer composition according to the first or second aspect is characterized in that the propylene-based copolymer comprises, based on the weight of propylene-based copolymer, (a) at least about 82.5 wt % to 92.5 wt % of propylene-derived units, (b) about 7.5 wt % to 17.5 wt % of units derived from at least one of ethylene or a $C_4$-$C_{10}$ alpha-olefin, and optionally (c) about 0 to 3 wt % of diene-derived units, wherein the propylene-based copolymer has a triad, tacticity, as determined by NMR, of from about 65% to about 95%, and a melt flow rate less than or equal to about 25 g/10 min measured at 230° C. and 2.16 kg weight.

In the fourth aspect, the polymer composition according to any of the first to third aspect is characterized in that the one or more fillers comprises:
i) carbon black, in an amount of from greater than 50 wt % to less than or equal to 60 wt % based on the total weight of the polymer composition; or
ii) fertile magnet powder, in an amount of from greater than 40 wt % to less than or equal to 90 wt % based on the total weight of the polymer composition; or
iii) calcium carbonate, in an amount of bran greater than 60 wt % to less than or equal to 84 wt % based, on the total weight of fee polymer composition; or
iv) alumina trihydrate, magnesium hydroxide, titanium dioxide, in an amount of from greater than 60 wt % to less than or equal to 85 wt % based on the total weight of the polymer composition.

In the fifth aspect, the polymer composition according to any of the first to fourth aspect is characterized in that the organic peroxide comprises at least one of dicumylperoxide, 2,5-dimethyl-2,5-di(t-butylperoxy)hexane, 1,1-bis(t-butylperoxy)-3,3,5-trimethylcyclohexane, 1,1-di-(t-butylperoxy)-cyclohexane, 2,2'-bis(t-butylperoxy) diisopropylbenzene, α,α-bis(tert-butylperoxy) diisopropyl benzene, 4,4'-bis(t-butylperoxy)butylvalerate, t-butyl-perbenzoate, t-butylperterephthalate, t-butyl peroxide, benzoyl peroxide, cumene hydroperoxide, t-butyl peroctoate, methyl ethyl ketone peroxide, lauryl peroxide, tert-butyl peracetate, diaryl peroxides, ketone peroxides, peroxydicarbonates, peroxyesters, dialkyl peroxides, hydroperoxides, and peroxyketals.

In the sixth aspect, the polymer composition according to any of the first to fifth aspect is characterized in that the cross-linking agents present in an amount of from 0.5 to 4 parts by weight based on 100 parts by weight of the propylene-based copolymer, and the coagent present in an amount of from 0.5 to 8 parts by weight based on 100 parts by weight of the first polymer.

In the seventh aspect, the polymer composition according to any of the first to sixth aspect is characterized in that the cross-linking agents present in an amount of from 0.8 to 3 parts by weight based on 100 parts by weight of the propylene-based copolymer, and the coagent present in an amount of from 1 to 5 parts by weight based on 100 parts by weight of the first polymer.

In the eighth aspect, this disclosure provides a method of making the polymer composition according to any of the first to seventh aspect comprising the step of mixing the first polymer, the one or more fillers, with the cross-linking pack at 60 to 130° C. 40 to 100 rpm for 10 to 20 minutes, and the step of molding at 150 to 200° C. for 3 to 40 minutes.

In the ninth aspect, the method according to the eighth aspect is characterized in that the mixing step is a multi-pass mixing step.

This disclosure will be described in more detail herein below by reference to the examples. The examples are not to be construed to limit the scope of the invention.

EXAMPLES

Materials and Methods

Vistamaxx™ 6102, a propylene-based copolymer commercially available from ExxonMobil Chemical Company, was used in the examples as a first polymer (First Polymer A).

Vistamaxx™ 6202, a propylene-based copolymer commercially available from ExxonMobil Chemical Company, was used in the examples as another first polymer (First Polymer B).

Exact™ 5061, an ethylene-based copolymer commercially available from ExxonMobil Chemical Company, was used in the comparison example 2 as "first polymer" (First Polymer C).

Homo-polypropylene was commercially available from ExxonMobil Chemical Company as hPP4712E1.

Polyethylene was commercially available from Exxon-Mobil Chemical Company as LLDPE 6201RQ.

Polypropylene was commercially available from Sunoco Inc. as PPFI80.

$CaCO_3$ was commercially available from Huber Company as Hubercarb M4 having a mean particle size of 4.0 μm.

$TiO_2$ was commercially available from Dupont Company as Ti-Pure® R-101 having an average particle size of 0.20 μm.

Carbon Black was commercially available from Cabot Corporation as VULCAN® 9A32 having an average particle size of 19 nm.

$Mg(OH)_2$ was commercially available from J. M Huber Corporation as Zerogen 50SP having an average particle size of 0.7 μm.

Barium Ferrite was commercially available from Sigma Aldrich Company as EXPO having an average particle size of 400 mesh.

Alumina Trihydrate ("ATH") was commercially available from Albemarle Corporation as Martinal 107 LEO having an average number from 1.6 μm to 1.9 μm.

CPE7130, a chlorinated polyethylene having high magnetic powder loadability, was commercially available from Weifang Yaxing Chemical Co., Ltd.

KH550, a silane coupling agent having a chemical structure of $NH_2CH_2CH_2CH_2Si(OC_2H_5)_3$, was commercially available from Nanjin Lipai Chemical Co., Ltd.

Tri-allyl cyanurate ("TAC") and dicumuylperoxide ("DCP") used as cross-linking pack in this disclosure was commercially available from Aldrich company.

Zinc oxide used as filler, liquid paraffinic wax used as a processing oil, were both commercially available from Sinopharm Chemical Reagent Co. Ltd.

Some test methods used in the examples are shown as follows.

| Test Methods | | | |
|---|---|---|---|
| Parameter | Test Method | Speed/ Conditions | Specimen Size |
| Hardness | ASTM D2240 | 15 a delay | Disk 2 mm/50 mm (thickness/diameter) |
| Tensile Strength | ASTM D638 | 500 mm/min | Type 3 dumb bell 2 mm ISO plaque |
| Elongation@break | ASTM D638 | | |
| Oxygen Index | ASTM D 286 | | |
| Volume resistivity Ohms. cm | GB1410-89 | | |

Maximum Filler Loading Test

The maximum filler loading for individual filler was measured according to the following procedure.

A), the First Polymer A was melt in a 0.08 liter Brabender mixer at filling factor of 75% and a chamber temperature of 180° C. Then about 50 wt % of filler was added and mixed at 100 rpm until torque measured was stable. The product was called Compound-1. The Compound-1 was compression molded at 180° C. to make a plaque.

B), following same process as A), the Compound-1 plaque was melt in a 0.08 liter Brabender mixer at filling factor of 75% and a chamber temperature of 180° C. Then about 5 wt % of same filler was added and mixed at 100 rpm until torque measured was stable. The product was called Compound-2. The Compound-2 was compression molded at 180° C. to make a plaque.

C), with same process as B), Compounds were made to load more and more filler until it was observed, that some filler powder stuck to the compounds. Then it was concluded the filler was over loaded and the previous filler loading level was considered as the maximum filler loading level. The maximum filler loading testing results are shown in Table 1.

TABLE 1

| maximum filler loading in the first polymer A | | | | | | |
|---|---|---|---|---|---|---|
| | Filler | | | | | |
| | Carbon Black | Calcium Carbonate | Titanium Dioxide | Barium Ferrite | Alumina Trihydrate | Magnesium Hydroxide |
| Max. Filler Loading (wt %) | 65 | 95 | 85 | 90 | 85 | 85 |

Comparison Example 1 and Examples 1 to 3

Comparison Example 1 and Examples 1 to 3 were prepared by compound the ingredients shown in Table 2 with a Haake-Rheocord 90, available commercially from Haake Inc., U.S.A. ("HAAKE mixed" hereinafter). The HAAKE mixer compounding was conducted at 110° C., 80 rpm for 10-15 minutes. Then the compounds were heat molded at 190° C. for 4 minutes to make sheet samples (around 1 mm and 2 mm).

The sheet samples were wrapped around a rod with a ½" radius at 20° C. by observing whether the samples were cracked or not (bending test). The hardness, tensile strength and elongation were measured. The testing results are shown in Table 3.

TABLE 2

Formulation for polymer composition in magnetic materials application

| | Chlorinated polyethylene (wt %) | First Polymer A (wt %) | Talc (wt %) | CaCO$_3$ (wt %) | Barium Ferrite (wt %) | KH550 (wt %) |
|---|---|---|---|---|---|---|
| Com. example 1 | 10 | | | | 90 | 0.1 |
| Example 1 | | 10 | | | 90 | 0.1 |
| Example 2 | | 10 | 5 | | 85 | 0.1 |
| Example 3 | | 10 | | 5 | 85 | 0.1 |

TABLE 3

Physical properties of the polymer compositions

| No. | Bending test | Elongation @ break (%) | Shore D Hardness |
|---|---|---|---|
| Com. Example 1 | Cracked | 7.1 | 74 |
| Example 1 | Not cracked | 88.5 | 68 |
| Example 2 | Not cracked | 86.7 | 68 |
| Example 3 | Not cracked | 87.4 | 68 |

As shown in the Table 3, the polymer composition according to the present disclosure achieved better balanced physical properties between flexibility, elongation and hardness which are very crucial in magnetic strip application hum the chlorinated polyethylene, which is mainly used in the industries.

Comparison Example 2 and Examples 4 to 7

Comparison Example 2 and Examples 4 to 7 were prepared by compound the ingredients according to the Table 4 with a HAAKE mixer. For non-peroxide systems, the HAAKE mixer compounding was conducted at 110° C., 80 rpm for 10-15 minutes. Then the compounds were heat molded at 190° C. for 4 minutes to make sheet samples (around 1 mm and 2 mm). For peroxide systems, the HAAKE mixer compounding was conducted at 80° C., 50 rpm for 10-15 minutes. Then the compounds were heat molded at 160° C. for 30 min to make sheet samples (around 1 mm and 2 mm). The testing results are shown in Table 5.

TABLE 4

Formulation for polymer composition in wire & cable application

| No. | First Polymer (phr) | ATH (phr) | KH550 (phr) | TAC (phr) | Zinc Oxide (phr) | DCP (phr) | Liquid paraffinic wax (phr) |
|---|---|---|---|---|---|---|---|
| Com. Example 2 | C | 100 | 250 | 0 | 0 | 0 | 0 |
| Example 4 | A | 100 | 250 | 0 | 0 | 0 | 0 |
| Example 5 | A | 100 | 250 | 0 | 2 | 3 | 2 | 10 |
| Example 6 | A | 100 | 300 | 5 | 0 | 0 | 0 |
| Example 7 | A | 100 | 300 | 5 | 2 | 3 | 2 | 10 |

TABLE 5

Physical properties of the polymer compositions

| | Tensile Strength @ break (MPa) | Elongation @ break (%) | Oxygen Index | Shore-D Hardness | Volume Resistivity (Ohms · cm) |
|---|---|---|---|---|---|
| Com. Ex. 2 | 7.7 | 790 | 31.0 | 42 | 5.8 E9 |
| Ex. 4 | 6.2 | 1000 | 26.0 | 30 | 5.1 E9 |
| Ex. 5 | 3.6 | 144 | 41.5 | 29 | 7.2 E10 |
| Ex. 6 | 3.3 | 274 | 48.0 | 42 | 2.7 E11 |
| Ex. 7 | 7.4 | 200 | 46.0 | 39 | 2.0 E13 |

As shown in the Table 5, the polymer composition according to the present disclosure achieved better balanced physical properties between flexibility, elongation and hardness, flame retardance and resistiveness, which are very crucial in wire and cable application, than the chlorinated polyethylene, which is mainly used in the industries.

A CaCO$_3$-polyethylene, a CaCO$_3$-polypropylene or a CaCO$_3$-First Polymer B masterbatch was respectively prepared according to the formulation for masterbatch composition as shown in Table 6. Two weight percent of the prepared CaCO$_3$-polyethylene, CaCO$_3$-polypropylene or CaCO$_3$-First Polymer B masterbatch were blended using a 53 mm 3-lobe twin screw extruder equipment with 15-barrel and a L/D of 46.7 into homopolypropylene (hPP4712E1) and extruded to form cast film at temperature between 180-200° C.

The typical processing conditions for blending were as follows:
Throughput rate: 37.5 kg/hr-43 kg/hr;
Extruder RPM: 350 rpm;
Die: 4-hole (1.25" diameter) with 6-blade cutter;
Maximum barrel temperature set point: 170° C.;
Die temperature set point: 220° C.-265° C.;
Die melt temperature: typically 200° C.-210° C.;
Raw material heed streams: 100% of polymer(s)@feed throat, 50% to 65% of CaCO$_3$@feed throat 35% to 50% of CaCO$_3$ side fed@barrel #8; and
Maximum pressure at the: 10.3 MPa-13.8 MPa.

The typical processing conditions for extrusion were as follows:
Chill Roll Temperature: 35° C.;
Chill Roll Speed: 2.7 meters/min;
Tension Force: 2.7 nm;
Winder Force: 5.5 nm;
Zone 1: 190° C.;
Zone 2: 200° C.;
Zone 3-5: 210° C.;
Melt Temp: 215° C. in average;
Screw Speed: 30 rpm;

Barrel Pressure: 7.8-8.9 MPa in average; and
Film thickness: 50 micron.
The properties of the prepared film were tested and the testing results are shown in Table 7.

TABLE 6

Formulation for Masterbatch Composition

| | polyethylene (wt %) | polypropylene (wt %) | First polymer B (wt %) | CaCO₃ (wt %) |
|---|---|---|---|---|
| Com. Ex. 3 | 20 | | | 80 |
| Com. Ex. 4 | | 20 | | 80 |
| Example 8 | | | 20 | 80 |
| Com. Ex. 5 | 30 | | | 70 |
| Com. Ex. 6 | | 30 | | 70 |
| Example 9 | | | 30 | 70 |

TABLE 7

Physical Properties of Blend Composition

| | Hardness - Shore D | Ultimate Tensile, 50 mm/min | Tensile Strength @ Break, 50 mm/min | Elongation @ Break, 50 mm/min |
|---|---|---|---|---|
| Com Ex 3 | 70 | 32 | 18 | 43 |
| Com. Ex. 4 | 72 | 31 | 23 | 34 |
| Example 8 | 70 | 30 | 14 | 128 |
| Com. Ex 5 | 70 | 34 | 29 | 15 |
| Com. Ex 6 | 72 | 35 | 20 | 26 |
| Example 9 | 71 | 28 | 16 | 43 |

Further, the film appearance rating (FAR) was tested on an optical control system ("OCS") instrument. The filler dispersion was measured by the mean particle size and standard deviation. Table 8 shows the statistic results of mean panicle size and standard deviation of fillers dispersed in the Comparison Examples 3 to 6 and Examples 8 to 9.

TABLE 8

Statistic results of CaCO₃ Masterbatch

| | CaCO₃-PE | CaCO₃-PE | CaCO₃-first polymer B |
|---|---|---|---|
| Mean Particle size (μm) | 89.2 | 71.2 | 72.2 |
| Standard deviation (μm) | 88.9 | 64.6 | 58.6 |

As shown, in the Table 8, the mean particle size and standard deviation of fillers incorporation into the blend composition according to the present disclosure were smaller than polyethylene or polypropylene-based masterbatch and thus had comparable or better dispersion than polyethylene or polypropylene-based masterbatch.

All documents described herein are incorporated by reference herein, including any priority documents and/or testing procedures. As is apparent from the foregoing general description and the specific embodiments, while forms of the invention have been illustrated and described, various modifications can be made without departing from the spirit and scope of the invention.

What is claimed is:

1. A polymer composition comprising:
A) less than 50 wt % of a first polymer based on the total weight of the polymer composition;
B) greater than 50 wt % of one or more fillers based on the total weight of the polymer composition; and optionally
C) a cross-linking pack;
wherein said first polymer comprises
a propylene-based copolymer comprising, based on the total weight of said propylene-based copolymer, (a) at least about 60 wt % of propylene-derived units, (b) about 5 wt % to about 35 wt % of units derived from at least one of ethylene or a $C_4$-$C_{10}$ alpha-olefin, and optionally (c) about 0 to 5 wt % of diene-derived units, wherein the polypropylene-based copolymer has a heat of fusion, as determined by DSC, of about 75 J/g or less, a melting point, as determined by DSC, of about 100° C. or less, and a crystallinity, as determined by DSC, of about 2% to about 65% from isotactic polypropylene sequences, and a melt flow rate from 0.5 to 1,000 g/10 min measured at 230° C. and 2.16 kg weight; and
wherein said one or more fillers comprise:
i) carbon black, in an amount of from greater than 50 wt % to less than or equal to 65 wt % based on the total weight of said polymer composition; or
ii) ferrite magnet powder, in an amount of less than or equal to 90 wt % based on the total weight of said polymer composition; or
iii) calcium carbonate, in an amount of from greater than 81 wt % to less than or equal to 85 wt % based on the total weight of said polymer composition; or
iv) alumina trihydrate, magnesium hydroxide, talc, titanium dioxide, natural fibers, polymeric fibers, glass fibers, marble dust, cement dust, clay, feldspar, silica or glass, fumed silica, alumina, magnesium oxide, antimony oxide, zinc oxide, barium sulfate, calcium sulfate, aluminum silicate, calcium silicate, titanates, nanoclay, organo-modified clay or nanoclay, glass microspheres, mica, wollastonite, chalk, graphite, or any combination thereof, in an amount of from greater than 60 wt % to less than or equal to 80 wt % based on the total weight of said polymer composition; and
wherein said cross-linking pack comprises a cross-linking agent in an amount of from 0.1 to 5 parts by weight and a coagent in an amount of from 0.05 to 10 parts by weight, based on 100 parts by weight of said first polymer, and wherein said cross-linking agent comprises organic peroxide and said coagent comprises at least one of di- and tri-allyl cyanurates and isocyanurates, liquid and metallic multifunctional acrylates and methacrylates, zinc-based dimethacrylates and diacrylates, and functionalized polybutadiene resins.

2. The polymer composition of claim 1, wherein said propylene-based copolymer comprises, based on the weight of said propylene-based copolymer, (a) at least about 75 wt % to 95 wt % of propylene-derived units, (b) about 5 wt % to 25 wt % of units derived from at least one of ethylene or a $C_4$-$C_{10}$ alpha-olefin, and optionally (c) about 0 to 4 wt % of diene-derived units, wherein said polypropylene-based copolymer has a triad tacticity, as determined by $^{13}C$ NMR, of from about 50% to about 99%, and the melt flow rate less than or equal to about 800 g/10 min measured at 230° C. and 2.16 kg weight.

3. The polymer composition of claim 1, wherein said propylene-based copolymer comprises, based on the weight of said propylene-based copolymer, (a) at least about 82.5 wt % to 92.5 wt % of propylene-derived units, (b) about 7.5 wt % to 17.5 wt % of units derived from at least one of ethylene or a $C_4$-$C_{10}$ alpha-olefin, and optionally (c) about 0 to 3 wt % of diene-derived units, wherein the propylene-based copolymer has a triad tacticity, as determined by $^{13}C$ NMR, of from about 65% to about 95%, and the melt flow rate less than or equal to about 25 g/10 min measured at 230° C. and 2.16 kg weight.

4. The polymer composition of claim 1, wherein said first polymer further comprises an ethylene/$C_3$-$C_{10}$ alpha-olefin copolymer.

5. The polymer composition of claim 4, wherein said ethylene/$C_3$-$C_{10}$ alpha-olefin copolymer is a copolymer of ethylene and at least one of $C_3$-$C_{10}$ alpha-olefin having the total crystallinity, as determined by DSC, of from 5 to 20% and the Brookfield viscosity from 3,000 to 20,000 cP measured at 177° C.

6. The polymer composition of claim 4, wherein said ethylene/$C_3$-$C_{10}$ alpha-olefin copolymer is a copolymer of ethylene and at least one of propylene, isobutylene, 1-butene, 1-pentene, 1-hexene and 1-octene.

7. The polymer composition of claim 1, said first polymer is a copolymer of propylene and ethylene.

8. The polymer composition of claim 1, wherein said one or more fillers comprise:
   i) carbon black, in an amount of from greater than 50 wt % to less than or equal to 60 wt % based on the total weight of the polymer composition; or
   ii) ferrite magnet powder, in an amount of from greater than 40 wt % to less than or equal to 90 wt % based on the total weight of the polymer composition; or
   iii) calcium carbonate, in an amount of from greater than 82 wt % to less than or equal to 84 wt % based on the total weight of the polymer composition; or
   iv) alumina trihydrate, magnesium hydroxide, titanium dioxide, in an amount of from greater than 60% to less than or equal to 78 wt % based on the total weight of the polymer composition.

9. A method for making the polymer composition of claim 1, comprising the step of mixing the first polymer with the one or more fillers, and optionally the cross-linking pack at 60 to 130° C., 40 to 100 rpm for 10 to 20 minutes, and the step of molding at 150 to 200° C. for 3 to 40 minutes.

10. The method of claim 9, wherein the mixing step is a multi-pass mixing step.

11. A roofing material, wire and cable insulation or jackets, magnetic strip, carpet backing, container, film, sheet, filament or sound deadening material comprising the polymer composition of claim 1.

12. A thermoplastic blend composition comprising:
   a polymer composition in an amount of from greater than 2 wt % to less than or equal to 40 wt % of the blend composition; and
   a second polymer present in an amount of from greater than or equal to 60 wt % to less than 98 wt % based on the total weight of the blend composition;
   wherein the polymer composition comprises:
      A) less than 50 wt % of a first polymer based on the total weight of the polymer composition;
      B) greater than 50 wt % of one or more fillers based on the total weight of the polymer composition; and optionally
      C) a cross-linking pack;
   wherein said first polymer comprises
      a propylene-based copolymer comprising, based on the total weight of said propylene-based copolymer, (a) at least about 60 wt % of propylene-derived units, (b) about 5 wt % to about 35 wt % of units derived from at least one of ethylene or a $C_4$-$C_{10}$ alpha-olefin, and optionally (c) about 0 to 5 wt % of diene-derived units, wherein the polypropylene-based copolymer has a heat of fusion, as determined by DSC, of about 75 J/g or less, a melting point, as determined by DSC, of about 100° C. or less, and a crystallinity, as determined by DSC, of about 2% to about 65% from isotactic polypropylene sequences, and a melt flow rate from 0.5 to 1,000 g/10 min measured at 230° C. and 2.16 kg weight; and
   wherein said one or more fillers comprise:
      i) carbon black, in an amount of from greater than 50 wt % to less than or equal to 65 wt % based on the total weight of said polymer composition; or
      ii) ferrite magnet powder, in an amount of less than or equal to 90 wt % based on the total weight of said polymer composition; or
      iii) calcium carbonate, in an amount of from greater than 81 wt % to less than or equal to 85 wt % based on the total weight of said polymer composition; or
      iv) alumina trihydrate, magnesium hydroxide, talc, titanium dioxide, natural fibers, polymeric fibers, glass fibers, marble dust, cement dust, clay, feldspar, silica or glass, fumed silica, alumina, magnesium oxide, antimony oxide, zinc oxide, barium sulfate, calcium sulfate, aluminum silicate, calcium silicate, titanates, nanoclay, organo-modified clay or nanoclay, glass microspheres, mica, wollastonite, chalk, graphite, or any combination thereof, in an amount of from greater than 60 wt % to less than or equal to 80 wt % based on the total weight of said polymer composition; and
   wherein said cross-linking pack comprises a cross-linking agent in an amount of from 0.1 to 5 parts by weight and a coagent in an amount of from 0.05 to 10 parts by weight, based on 100 parts by weight of said first polymer, and wherein said cross-linking agent comprises organic peroxide and said coagent comprises at least one of di- and tri-allyl cyanurates and isocyanurates, liquid and metallic multifunctional acrylates and methacrylates, zinc-based dimethacrylates and diacrylates, and functionalized polybutadiene resins; and
   wherein said second polymer comprises a polypropylene having a melting point of greater than or equal to 110° C., as determined by DSC.

13. The thermoplastic blend composition of claim 12, wherein said second polymer is polypropylene homopolymer.

14. The thermoplastic blend composition of claim 12, comprising said polymer composition in an amount of from greater than 30 wt % to less than or equal to 40 wt % based on the total weight of said blend composition, and said second polymer in an amount of from greater than or equal to 60 wt % to less than 70 wt % based on the total weight of said blend composition.

15. The polymer composition of claim 12, wherein said propylene-based copolymer comprises, based on the weight of said propylene-based copolymer, (a) at least about 82.5 wt % to 92.5 wt % of propylene-derived units, (b) about 7.5 wt % to 17.5 wt % of units derived from at least one of ethylene or a $C_4$-$C_{10}$ alpha-olefin, and optionally (c) about 0 to 3 wt % of diene-derived units, wherein the propylene-based copolymer has a triad tacticity, as determined by $^{13}C$ NMR, of from about 65% to about 95%, and the melt flow rate less than or equal to about 25 g/10 min measured at 230° C. and 2.16 kg weight.

16. The polymer composition of claim 12, wherein said first polymer further comprises an ethylene/$C_3$-$C_{10}$ alpha-olefin copolymer.

17. The polymer composition of claim 16, wherein said ethylene/$C_3$-$C_{10}$ alpha-olefin copolymer is a copolymer of ethylene and at least one of $C_3$-$C_{10}$ alpha-olefin having the total crystallinity, as determined by DSC, of from 5 to 20% and the Brookfield viscosity from 3,000 to 20,000 cP measured at 177° C.

18. A roofing material, wire and cable insulation or jackets, magnetic strip, carpet backing, container, film, sheet, filament or sound deadening material comprising the thermoplastic blend composition of claim 12.

* * * * *